April 6, 1971   R. R. WAHLBERG   3,574,016
METHODS OF FORMING SEAMS IN MOISTURE BARRIERS FOR CABLES
Original Filed Oct. 20, 1967   3 Sheets-Sheet 1
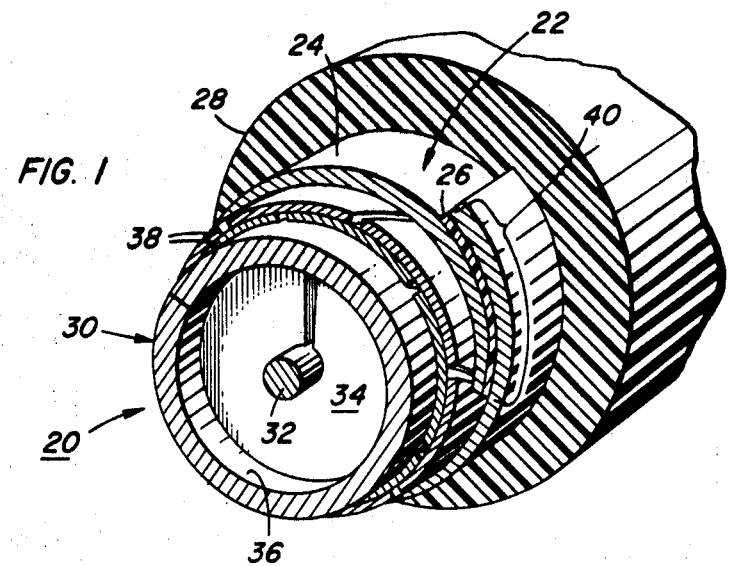
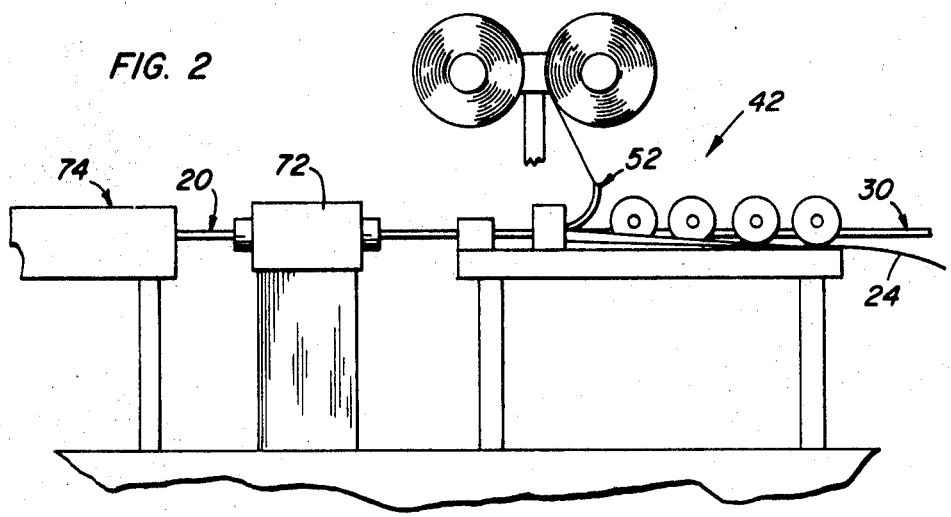
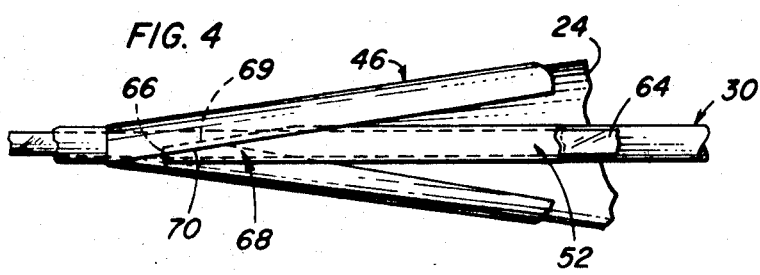
INVENTOR
R. R. WAHLBERG
BY Don P. Bush
ATTORNEY

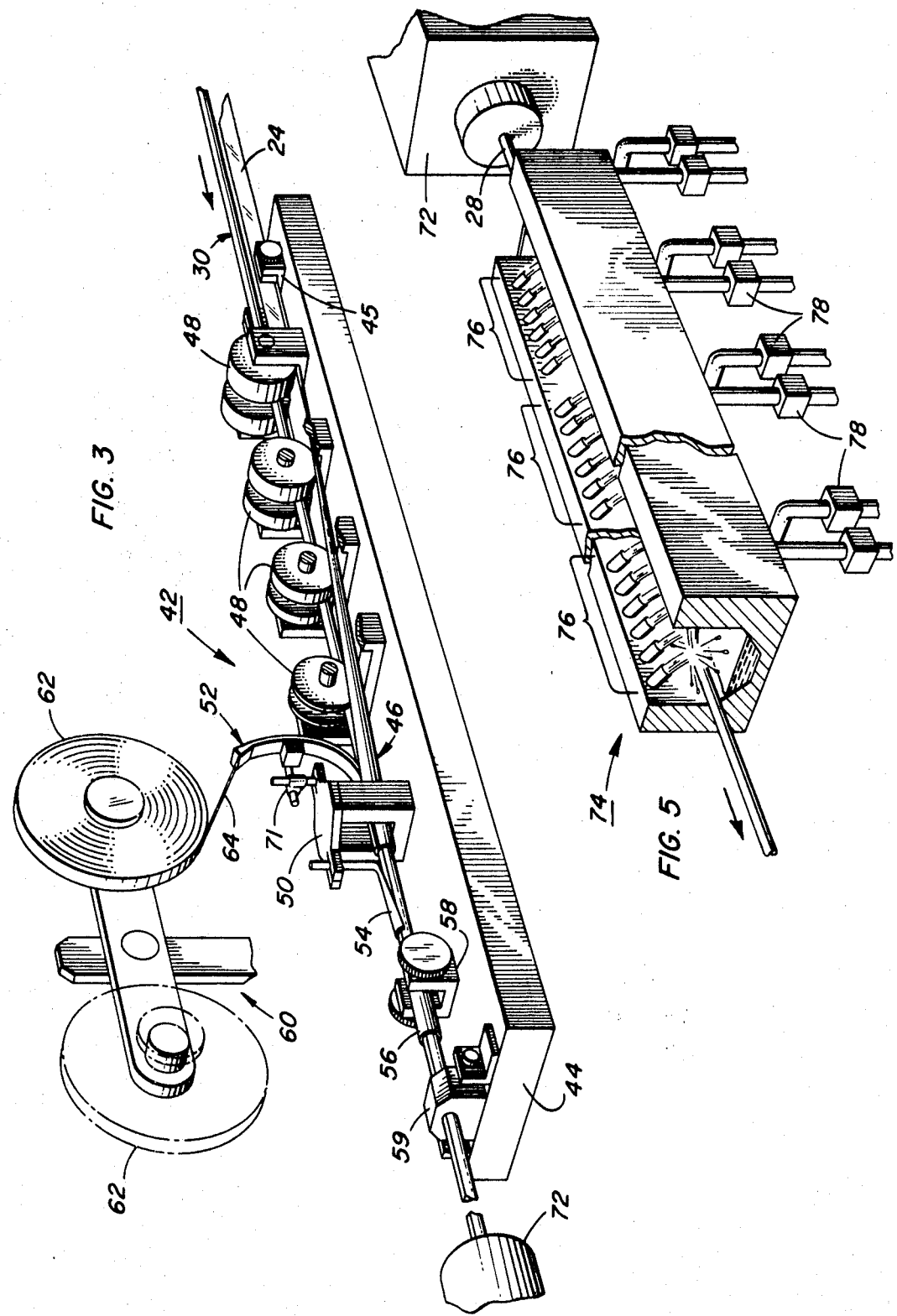

United States Patent Office 3,574,016
Patented Apr. 6, 1971

3,574,016
METHODS OF FORMING SEAMS IN MOISTURE BARRIERS FOR CABLES
Roger R. Wahlberg, Bloomfield, N.J., assignor to Western Electric Company, Incorporated, New York, N.Y.
Original application Oct. 20, 1967, Ser. No. 676,770. Divided and this application Apr. 1, 1969, Ser. No. 836,182
Int. Cl. H01b 13/10
U.S. Cl. 156—54
6 Claims

ABSTRACT OF THE DISCLOSURE

A communications cable sheath is provided with a sealed metallic barrier to prevent moisture diffusion into transmission components of the cable. The barrier is formed of a longitudinally applied metallic strip in which a resultant overlapped seam is sealed with an acrylic acid-ethylene copolymer that has been inserted into the seam, in tape form, and subsequently heated by the extrusion of a thermoplastic sheath over the metallic strip or, in the alternative, is heated by passing the formed metallic strip and the associated transmission components through an induction type or other appropriate heating device. An alternate embodiment involves a cable sheath in which the copolymer is applied as a precoating on the inside surface of the metallic strip. Heat transfer from the thermoplastic extrusion operation to the overlapped seam can take place without encountering an insulating barrier of the copolymer. The latter embodiment can be practiced with virtually no change to conventional cable sheathing equipment and apparatus.

This is a division of application Ser. No. 676,770, filed Oct. 20, 1967 and now abandoned.

BACKGROUND OF THE INVENTION

(1) Field of the invention

The invention relates to methods of making sheaths for communications cables in which there are provided sealed metallic moisture barriers to prevent molecular diffusion of water vapor into the cables.

(2) Description of the prior art

It is well known in the cable industry that diffusion of water vapor taking place in a unidirectional manner through a polyethylene jacket will result in undesirably high moisture levels inside a sheath of a cable, and that high moisture level will have a detrimental effect on the transmission characteristics of the cable.

Polyethylene has the ability to prevent passage of water through itself only on a macroscopic scale. Where cables are used over long periods of time, in the order of magnitude of 20 to 40 years, and where the circuits within these cables are sensitive to the presence of moisture, it becomes necessary to give consideration to the prevention of moisture entrance into a cable not only on a macroscopic level but also on a molecular level.

Changing weather and climatic conditions cause differences in vapor pressure to exist between the inside and the outside of the cable sheath, and these differences in vapor pressure almost invariably operate to cause diffusion of moisture to occur in a unidirectional manner from the outside of the cable to the inside of the cable with the result that eventually an untolerably high moisture level will develop inside the cable if a polyethylene jacket is the only barrier to the entrance of moisture.

It is also well known that an effective barrier against moisture diffusion into a core of the cable can be achieved with a metallic tube surrounding the cable core. If the tube is made from a single strip of metal film formed longitudinally about the cable, its effectiveness as a moisture barrier is enhanced greatly if its resultant seam is sealed. The most effective seal, from the moisture barrier point of view, is one in which a metal to metal bond exists, such as a welded or soldered seal.

However, the materials which make up most communications cable are temperature sensitive and are easily damaged if overheated. This temperature sensitivity makes the use of metal welding as a sealing technique impractical because of the high temperatures involved in most ordinary welding processes.

Since most communications cable requires an electrically conductive, metallic sheath, to shield against external electrical signals, it is usually desirable to incorporate the shielding function with the moisture barrier function in one single layer of metal. Good electrical conductivity is a requisite of a shielding material, and the best over-all compromise for a material to fit all needs of a metal layer has been found to be aluminum. Aluminum, however, because of its highly reactive nature, maintains, almost consistently, an oxide film which virtually precludes continuous soldering as a joining technique in situations such as the manufacturing of a cable sheath.

In order to overcome the problems associated with the difficulties in soldering aluminum, the use of an additional layer of easily soldered metal such as tin plated steel was introduced into the manufacturing of a moisture-proof shield. The tin plated steel was used to surround the outside of the aluminum shielding material and act as a solderable component. The steel also provided additional structural strength for the sheath, but this additional structural strength was not always needed. So there existed in cable sheath designs, where structural strength was not an important requirement, an extra cost increasing component in the form of a layer of tin plated steel.

Even in the cases where the structural strength of the tin plated steel was necessary and the steel would be retained in the cable sheath, the existence of solder and its associated expenses and relatively high temperature melting processes would be undesirable characteristics of such a cable sheath design.

It has been found that moisture barrier properties of a cable sheath can be attained simply by adhesively joining an overlapped seam of metal tape instead of soldering the seam. Many adhesive systems have been used to effect the sealing of the overlapped seam in cable sheath. These adhesive systems can generally be referred to as single component systems and multicomponent systems. Mastics are a class of adhesives of the single component type which have been used in the past to seal overlapped seams in cables. One example of a mastic that was used extensively is asphalt. Mastics, however, have the disadvantage of not being curable to a form which will provide significant mechanical strength or sufficient prevention of moisture diffusion.

Multicomponent adhesive systems have been used with some success in providing a sealed cable sheath seam with mechanical strength and diffusion barrier ability. These adhesive systems, however, have the disadvantage of requiring that two or more components must be mixed at the time when it is desired to make the adhesive bond. Very often, the application of multiple adhesive components in liquid form and their proper proportioning and mixing require elaborate devices and techniques.

Metal tapes which have been precoated with polymer on their inner surfaces have been employed as materials for moisture barriers. The metal tapes in these cases have usually been formed into a "finned" configuration wherein the two edges of a longitudinally applied tape are oriented radially of the cable core with the polymer coatings on the inner surfaces of each of these edges being in contact. The two edges are then heated and pressed to form a bond between the polymer coatings. The projecting sealed "fin" is then folded down to lie substantially parallel to the main portion of the formed metal tape. The sealing of the "fin" is sometimes accomplished by the heat of a polymeric jacket extruded over the metal tape rather than in a separate sealing operation.

The use of this "finned" seam system results in at least three thicknesses of material existing along some part of the periphery of the metal tape and these multiple thicknesses of material add to any non-uniformity in the thickness of a polymeric jacket applied over the metal tape. The forming and sealing of the "fin" type seam is much more difficult than forming and sealing an overlap seam.

An example of an adhesive material which can be used in an overlapped seam is a copolymer consisting of a backbone essentially polyethylenic in form with attached carboxyl groups. Adhesive copolymers such as these are capable of creating sound bonds between metal and metal.

Manufacturers of cable have used the bonding properties of adhesive copolymers to create cable sheaths in which polyethylene jackets are bonded to the surface of aluminum tapes which have been wrapped around the cable. This is usually done by precoating an aluminum tape with adhesive copolymer, across its entire width, before forming it into a tube around the cable. When a polyethylene jacket is applied over such a precoated aluminum tape, the heat from the semimolten polyethylene being extruded around the precoated tape causes a bonding reaction between the adhesive copolymer, the aluminum and the polyethylene jacket. If the heat imparted to the polyethylene material is sufficiently high, the aluminum tape will become hot enough so that bonding will also occur between overlapped layers of tape at the seam.

Using a system which results in a fully bonded sheath such as that described above, while creating a reasonably good moisture barrier, results in some problems. One problem developing from the use of a fully bonded sheath occurs when splices of the sheathed cable are to be made. Present splicing practices require the removal of the polyethylene jacket from the aluminum tape at a splice location in order to develop electrical contact with the aluminum tape at the splice location and assure that the shielding function of the aluminum tape takes place. When the jacket is fully bonded to the aluminum, the removal of the jacket becomes a very difficult task for a craftsman in the field.

Another problem which develops during the manufacturing of a fully bonded sheath relates to the amount of heat necessary to create a seal at the overlapped seam. When the aluminum tape is fully coated on its outer side with an adhesive copolymer, the copolymer acts as an insulating barrier to the transfer of heat from the polyethylene jacket material to the aluminum. In order to transfer the necessary heat through the insulating barrier and thereby accomplish a proper bond at the overlapping seam, it is necessary to provide an excessive amount of heat. This may be accomplished by heating the polyethylene jacket material to a higher temperature than would be necessary if the insulating barrier did not exist. It is well known that the longevity and performance characteristics of polyethylene are adversely affected by increasing the temperature at which the polyethylene resin is processed above predetermined levels. The higher temperature to which the polyethylene jacket material would have to be raised to cause sufficient heat to be conducted through the insulating barrier created by the existence of an adhesive copolymer across the entire width of the aluminum tape might very well have a deleterious effect on the polyethylene.

It is easily recognized that the transfer of heat from the polyethylene jacketing material into the adhesive copolymer is not solely temperature dependent but is dependent upon time and temperature. Thus, it is possible to achieve a fully bonded sheath with a relatively low temperature of polyethylene jacketing material; but if this is to be done, it is necessary to allow heat transfer to take place over a longer period of time. In a continuous manufacturing operation such as the extrusion of a polyethylene jacket onto a cable, an increase of time during which a polyethylene jacket will remain hot enough to operate effectively to seal an adhesive copolymer can, as a practical matter, only be achieved by decreasing the linear rate at which the cable passes through an extruder head or the rate at which cooling is accomplished. Obviously, a decrease in the cable feeding or cooling rate causes a decrease in production output or an increase in floor space required for equipment and consequently an increase in the cost of the manufactured product.

When an adhesive copolymer is used to seal a cable, the greatest portion of advantage over an unsealed cable is brought about by sealing the overlapped seam. Bonding the polyethylene jacket to the metal around the entire outer surface of the metal produces only a secondary effect in enhancing the moisture barrier properties of the sheath. Thus, it is possible, by restricting the bonding of the metal to only an overlapped seam area, to accomplish virtually all of the moisture diffusion prevention which might be required in the cable while precluding the disadvantages associated with a cable sheath where the metal is bonded to the jacket around the entire inner surface of the jacket.

SUMMARY OF THE INVENTION

It is an object of the present invention to provide new and improved methods of producing cables having adhesively sealed metallic moisture barriers in their sheaths to prevent molecular diffusion of moisture into the core of the cables.

It is another object of the invention to provide methods of producing cables having sheaths in which thermoplastic jackets are removable easily from metallic moisture barriers.

It is a further object of the invention to provide methods of producing cables having moisture barriers which even though utilizing heat for sealing seams, do not utilize so much heat that temperature sensitive internal components of the cables are damaged by the application of heat to the seam area.

A method illustrating certain features of the invention may include the steps of advancing successive sections of a cable core along a predetermined path, forming at least one metallic strip around successive sections of the advancing cable core with at least one overlapped seam, and with the resultant formed strip having inwardly and outwardly facing major surfaces, the inwardly facing major surface facing the core, introducing an essentially non-metallic sealing material between the contiguous adjacent, mating portions of the major surfaces of the metallic strip which face each other at the overlapped seam, simultaneously with forming the overlapped seam, with the presence of any of the the sealing material on the major surfaces of the metallic strip, other than at the overlapped seam, being restricted in location to the inwardly facing major surface facing the core, the essentially non-metallic sealing material being characterized by being capable of maintaining a definite form at ambient temperature, and being capable of developing an adhesive bond with the metallic strip at a predetermined temperature above ambient temperature, applying heat to successive portions of the overlapped seam to elevate the temperature of the adhesive material to at least the predetermined temperature, and maintaining a proper positional relationship between the contiguous, adjacent, mating portions of the major surfaces of the metallic strip which face each other at the overlapped seam to assure that the sealing material contacts the mating portions of the major surfaces while the material is at the elevated temperature.

BRIEF DESCRIPTION OF THE DRAWINGS

Other objects and features of the present invention will be more readily understood from the following detailed description of specified embodiments thereof when read in conjunction with accompanying drawings in which:

FIG. 1 is a perspective, cross-sectional view of a communications cable manufactured in accordance with the principles of the present invention in which successive layers of the cable have been partially removed for purposes of clarity and in which various layers of material are shown disproportionately thick for purposes of clarity;

FIG. 2 is a simplified elevational view of apparatus used to practice an inventive method of manufacturing the cable;

FIG. 3 is an enlarged perspective view of a metal forming and tape insertion portion of the apparatus shown in FIG. 2 with various portions broken away for purposes of clarity;

FIG. 4 is an enlarged, fragmentary, plan view of a portion of the apparatus shown in FIG. 3 with particular attention directed to illustrating the positional relationship between a forming anvil and an adhesive tape applicator, in which all other portions of the apparatus of FIG. 3 and in which dotted lines relating to a metal tape being formed and a cable being covered are omitted for purposes of clarity;

FIG. 5 is an enlarged, fragmentary, perspective view of a plastic extruding and cooling portion of the apparatus shown in FIG. 2;

DETAILED DESCRIPTION

Figure 6:
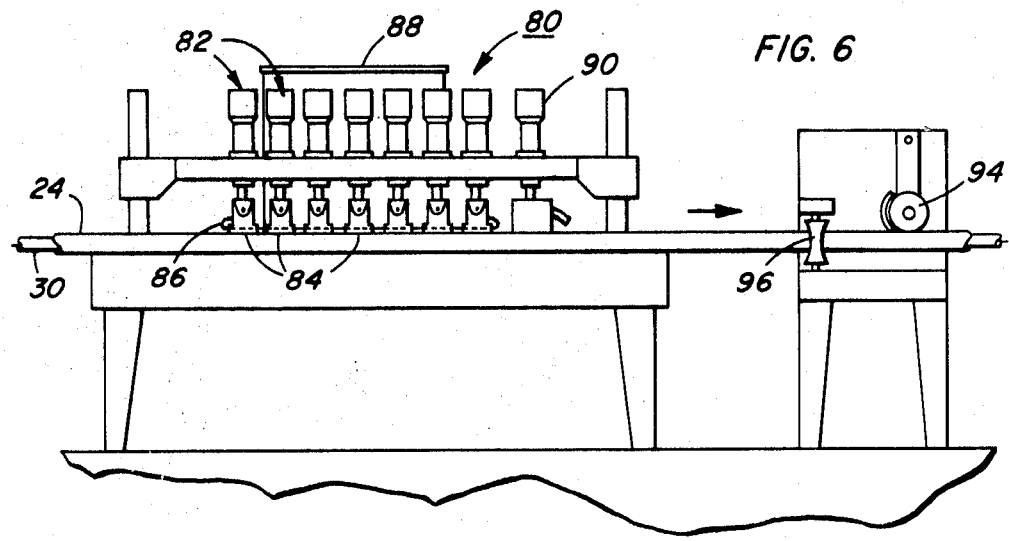
FIG. 6 is a simplified elevational view of apparatus used to practice an alternate inventive method of manufacturing the cable.

One embodiment of the cable manufactured in accordance with the principles of the present invention is illustrated in FIG. 1 where there is shown a cross-sectional view of a communications cable, designated generally by the numeral 20, in which a moisture barrier, designated generally by the numeral 22, has been applied. The moisture barrier 22 includes a metallic strip 24, applied with one of its major surfaces facing a core of the cable 20, and an adhesive seal 26. The cable 20 has a jacket 28 of a polymeric material such as polyethylene completely surrounding it on the outside of the moisture barrier 22.

The core of the cable 20 is a conventional, 0.375 inch nominal diameter, disc-insulated coaxial cable unit, designated generally by the numeral 30, which includes a center copper conductor 32, a plurality of polyethylene-disc insulators 34—34, an outer copper conductor 36, 0.012 inch thick, and a double wrap of helically-applied steel tapes 38—38, each tape being 0.50 inch wide and 0.006 inch thick. The overall diameter of the unit 30 is 0.43 inch.

The cable 20, which is formed of an individually sheathed, single, disc-insulated coaxial unit 30, is often used as feeder cable for broad band transmission required in community antenna television systems. Such an application requires a relatively inexpensive sheath with good electrical shielding properties as well as a good ability to prevent moisture diffusion, since the presence of moisture within the coaxial unit 30 is highly detrimental to the ability of the coaxial unit to function properly as a broad band transmission medium.

The moisture barrier 22 functions to help prevent the diffusion of water vapor into the coaxial unit 30 of the communications cable 20. In addition to serving the diffusion prevention function, the metallic strip 24 of the moisture barrier 22 operates effectively to absorb the energy from stray electromagnetic fields emanating from sources outside the communications cable 20. Due to the fact that the metallic strip 24 serves a dual function, the strip is preferably an electrically continuous strip of Electrical-Conductor grade aluminum alloy, approximately 0.008 inch thick. The particular material and thickness of metal from which the metallic strip 24 is made is not important to the invention; and if economic circumstances and transmission capability considerations were to warrant it, the metal could be copper or brass or any of a number of other conductive materials.

The physical size of the adhesive seal 26 is an important factor in the ability of the moisture barrier 22 to prevent diffusion of water into the coaxial unit 30. The rate at which water vapor diffuses through a material is proportional to the area which is exposed to the source of water vapor, and the rate of diffusion is inversely proportional to the length of the path through which the water vapor must travel. It is obvious then that as an overlapped seam portion 40 of the moisture barrier 22 increases in width and as the thickness of the adhesive seal 26 in the seam portion decreases, the ability of the adhesive seal to prevent moisture diffusion is increased. As a practical matter, however, it becomes necessary to assign finite dimensions to the adhesive seal 26.

Considerations such as cost of the final manufactured communications cable 20 and the ability to successfully manufacture the cable are factors which lead to a determination of the dimensions of the adhesive seal 26. A desirable size for the adhesive seal 26, in the case of the coaxial unit 30, is approximately 0.002 inch thick and 0.375 inch wide. The 0.375 inch width of the adhesive seal 26 corresponds to a 0.375 inch width for the overlapped seam portion 40 of the moisture barrier 22.

The desirability of the physical size of the adhesive seal 26 and a method for making the adhesive seal can be seen by referring to the technique through which the adhesive seal is made. This technique is illustrated in FIGS. 2 and 3. Referring now to FIGS. 2 and 3, there is shown a metallic strip 24 being formed over a coaxial unit 30 through the use of a tube-forming device, designated generally by the numeral 42.

The tube-forming device 42 includes a stand 44, an adjustable edge guide 45, a forming anvil, designated generally by the numeral 46, forming rolls 48—48, a support 50 for an adhesive tape applicator, designated generally by the numeral 52, a seam former 54, a tube sizer 56 mounted pivotally within an adjustable mounting 58, and a die 59. Associated with the tube-forming device 42 and mounted in a nearby position above the device, there is a dual-position supply stand, designated generally by the numeral 60, on which pads 62—62 of an adhesive tape 64 can be placed and from which the adhesive tape can be supplied to the adhesive tape applicator 52 on a continuous basis.

The seam former 54 serves to properly shape the seam portion 40 of the metallic strip 24 as the metallic strip progresses to the tube sizer 56.

Referring now to FIGS. 3 and 4, a detailed view of the adhesive tape applicator 52 and its position with respect to the forming anvil 46 is shown. The adhesive tape applicator 52 is a curved, flattened tube through which the adhesive tape 64 is drawn. An exit portion 66 of the applicator 52 is aligned with an overlapped area, designated generally by the numeral 68, of the forming anvil 46 so that a truncated edge 69 of the applicator is substantially parallel to an upper edge 70 of the overlapped area.

The existence of the truncated edge 69 allows the applicator 52 to be inserted into the overlapped area 68 of the anvil 46 without a development of interference between the applicator and the anvil due to the transverse curvature of the anvil. This arrangement allows the adhesive tape 64 to feed properly into the seam portion 40 (FIG. 1) of the moisture barrier 22. An adjustable linkage 71 is provided so that proper positioning of the applicator 52 can be obtained.

The adhesive tape 64 is preferably a thermoplastic type hot melt adhesive. Of particular significance among the properties of the adhesive tape 64 is the ability of the tape to prevent moisture diffusion. Materials which provide highly effective barriers to moisture diffusion and exhibit good adhesive properties are copolymers consisting of a backbone essentially polyethylenic in form with attached carboxyl groups which are made by copolymerizing ethylene with acrylic acid. These copolymers and their use in the wire and cable industry were discussed in a presentation entitled, "Adhesive Thermoplastic Copolymers for the Wire and Cable Industry" made at the Twelfth Annual Wire and Cable Symposium at Asbury Park, N.J. in December 1963 by Messrs. G. E. Clock, G. A. Klumb and R. C. Mildner. The copolymers are available commercially from many sources, some of examples of which are Dow Chemical Company of Midland, Mich. under the designations Copolymer Resin 4333.9 and from E. I. du Pont de Nemours and Company, Incorporated of Wilmington, Del. as Surlyn A 1650. The adhesive tape 64 retains most of the physical properties generally associated with polyethylene; but in addition, has the ability to become firmly bonded to the metallic strip 24 at the seam portion 40 because of the presence of the reactive carboxyl groups in the adhesive tape. Other polymerization products which contain carbonyl groups have been found to be effective to form the adhesive seals 26—26. These other polymers might include ethylene or propylene monomers polymerized with esters or ketones.

Refer now to FIGS. 2, 3 and 5 for the apparatus and FIG. 1 for the product. A conventional plastics extruder 72 is used to extrude the circumferential jacket 28 of polyethylene over the metallic strip 24 of the moisture barrier 22. Molten polyethylene can emerge from the extruder 72 at a temperature of from 375° F. to 475° F. It is more desirable to restrict the temperature range to one of 25° F. between 425° F. and 450° F. There is sufficient heat within the polyethylene so that heat transfer takes place to the metallic strip 24 and into the adhesive tape 64; and as a result of this heat transfer, the temperature of the adhesive tape is raised sufficiently to allow the bonding of the adhesive tape to take place, thereby achieving the moisture proof adhesive seal 26 within the seam portion 40 of the moisture barrier 22.

The importance of having an adhesive tape 64 of the proper thickness can be seen at this time. Although it is desirable to have the resultant adhesive seal 26 as thin as possible so that moisture diffusion is kept at a low level, it is also necessary that the adhesive tape 64 have a sufficient cross-sectional area to provide the necessary internal strength to withstand the forces developed on it as it passes from the pad 62, through the adhesive tape applicator 52 and into position within the seam portion 40 of the moisture barrier 22. The thermoplastic nature of the adhesive tape 64, as well as a finite thickness of 0.002 inch, cooperates to provide an adhesive which, when heated, will still have sufficient body and bulk to accommodate minute variations in the distances between adjacent portions of the two edges of the metallic strip 24 forming the seam portion 40 when the strip is formed properly into a cylinder.

In order to assure that satisfactory bonding takes place across the entire width of the seam portion 40, it is necessary that the portions of the metallic strip 24 forming the components of the seam portion remain parallel to each other and in relatively good contact with each other as they pass through the extruder 72.

Even though it would be desirable, from the moisture-diffusion-prevention point of view, to have the seam portion 40 as wide as possible, it becomes impractical, with conventional tube forming equipment, to maintain the necessary parallel relationship between the components of the seam portion for a width which is much greater than 0.375 inch. It has been determined that making the seam portion 40 with a width of 0.375 inch and well sealed is better from a diffusion-prevention point of view than making a wider overlapped portion in which the quality of sealing is questionable.

After a polyethylene jacket 28 has been extruded onto the metal-covered coaxial unit 30, one of the foremost considerations that is made is the prevention of an excessive amount of heat flowing from the hot plastic, jacketing material into the heat sensitive disc insulators 34—34. The technique employed to prevent such damaging heat flow in a relatively rapid chilling of the plastic jacket 28, with a spray of cold water, (temperature 50° F.). Water at 50° F. is preferred but water at other temperatures and other heat absorbing media can be made to perform satisfactorily. It is, however, necessary to allow some of the heat from the polyethylene jacket 28 to flow into the adhesive tape 64 to cause the bonding to take place.

Referring still to FIG. 1 for the product and FIGS. 2, 3 and 5 for the apparatus, a cooling trough, designated generally by the numeral 74, is utilized to achieve a proper balance of heat flow into the adhesive tape 64 without excessive heat flow into the coaxial unit 30. The cooling trough 74 includes, in addition to a conventional immersion section (not shown), a series of spray sections 76—76 with each section being controlled through independent valves 78—78. By utilizing a varying number of the spray sections 76—76, the cooling trough 74 can be effectively made of variable length. Thus, when the communications cables 20—20 are manufactured with polyethylene jackets 28—28 of various thicknesses, a proper number of the spray sections 76—76 can be employed to chill the polyethylene jacket at the proper points and at the proper rates so that sufficient heat transfer occurs and sealing of the moisture barriers 22—22 is accomplished without incurring heat damage to the disc insulators 34—34.

An example of a set of conditions in which proper heat balance is achieved is one where the coaxial unit 30 has the polyethylene jacket 28 applied over its associated moisture barrier 22 wilth a nominal thickness of 0.047 inch and at a temperature of 435° F. In such a case, the communications cable 20 emerges into ambient-temperature air and travels a distance of two feet before encountering a chilled water spray at 50° F. when the communications cable is being processed at the rate of 50 feet per minute. In another example where one of the coaxial units 30—30 has the jacket 28 extruded at a temperature of 435° F. with a nominal thickness of 0.074 inch, the communications cable 20 is allowed to travel one foot at the rate of 50 feet per minute before the chilled water spray of 50° F. is applied to it.

It has been found that the application of water spray to the communications cables 20—20, such as those described in the above examples, without allowing the illustrative periods of time to elapse, results in faulty bonding in the seam portion 40. It is thought that the faulty bonding can be attributed to a failure to achieve a bonding temperature within the adhesive tape 64. Manufacturers of the adhesive tape 64 recommend that a temperature of from 350° F. to 400° F. be attained to achieve optimum bonding. However, experience has shown that temperatures in order of 200° F. will provide a satisfactory bonding.

It is important to maintain contacting pressure during the time when the adhesive tape 64 is at an elevated temperature. Contacting pressure means sufficient pressure to provide sound contact between mating portions of the metallic element 24 which make up the seam portion 40. The amount of pressure needed to maintain contact is, of course, dependent upon the properties of the material from which the metallic element 24 is formed. In the case of the 0.008 inch thick aluminum used in the cable 20, it seems that the relatively rigid and uniform nature of the coaxial unit 30 which is being covered and the ability of the tube forming device 42 to form the metallic strip 24 smoothly over the coaxial unit cooperate to provide a situation in which the metal components of the seam portion 40 are parallel to one another and are placed in firm contact with one another by the addition of the relatively slight pressure developing from the polyethylene jacket 28 simultaneously contracting and being drawn against the metallic strip by the presence of a vacuum within a tube of extrudate coming out of the extruder 72 and forming the jacket. The vacuum is provided by a conventional vacuum system (not shown) mounted on the extruder 72. Sufficient pressure for bonding can also be achieved by utilizing a conventional pressure extrusion technique rather than the tubing technique described above.

Referring now to FIG. 1 for the product and FIGS. 3 and 6 for the apparatus, there is shown, as an alternate embodiment of the invention, in which sealing of the seam portion 40 of the moisture barrier 22 can be accomplished independently of a jacket extrusion operation. Forming of the metallic strip 24 about the coaxial unit 30 and insertion of the adhesive tape 64 is accomplished in the same manner as that described in the first embodiment and as illustrated in FIG. 3. After successive portions of the adhesive tape 64 are in position, they are drawn into an induction heating unit, designated generally by the numeral 80, similar to the units disclosed in U.S. Pats. 2,758,189, 2,801,316 and 2,925,485 which issued Aug. 7, 1956, July 30, 1957 and Feb. 16, 1960 respectively to D. A. Hughes.

One of the coaxial units 30—30 which has been covered by the metallic strip 24 passes beneath a series of pressure applicators, designated generally by the numerals 82—82. The pressure applicators 82—82 make contact with the coaxial unit 30 by means of pressure shoes 84—84. Positioned within each of the pressure shoes 84—84 and passing continuously through the shoes, is a heating coil 86. The heating coil 86 is a highly conductive element connected directly to the secondary of a conventional, radio-frequency, induction-heating transformer 88, which is driven by a conventional induction heating power supply (not shown).

As the metal covered coaxial unit 30 passes under the heating coil 86, high frequency magnetic fields created by the heating coil cause currents to develop within the seam portion 40 of the moisture barrier 22, thus heating the seam portion. By properly controlling the power to the induction heating unit 80 with conventional control means (not shown), it is possible to provide sufficient heating to accomplish bonding in the seam portion 40 without degradation of the adhesive tape 64 or melting of the disc insulators 34—34.

A spring-biased, water quenching station 90 is located immediately adjacent the exit end of the heating coil 86. The water quenching station 90 sprays water at ambient temperature onto the seam portion 40 to cool it while maintaining pressure on the seam portion.

After the metallic strip 24 is bonded into a tubular shape on the coaxial unit 30, the unit may be placed on a reel (not shown) and the polyethylene jacket 28 applied to the outside of the metal covered coaxial unit in a subsequent operation (not shown).

One of the advantages in using a moisture-barrier application technique which consists of a two step operation (heating and later jacketing) is that the integrity of the adhesive seal 26 can be checked before the polyethylene jacket 28 is applied. Various techniques can be used to check the integrity of the adhesive seal 26. One technique is described in U.S. Patent 2,988,917, issued on June 20, 1961 to C. A. Hallam et al. The system utilized in the Hallam et al. Patent employs an electrical sensing device 94 cooperating with a continuous rolling distortion device 96. This system operates to check the mechanical integrity of the adhesive seal 26 continuously as the moisture barrier 22 is being applied and sealed. If defects are found in the adhesive seal 26, the continuous forming and sealing operation can be stopped long enough to allow a repair to be made to the defective portion of the adhesive seal. Conventional control systems (not shown) are readily available that will allow the proper amount of heat to be applied to the seam portion 40 through the induction heating unit 80 as the coaxial unit 81 is being started and stopped when repairs are required.

Another technique which can be utilized to determine the integrity with which the adhesive seal 26 has been made in the moisture barrier 22 in the pressurizing of the moisture barrier internally after a length of the metal covered coaxial unit 30 is on a reel (not shown). The pressurization can be accomplished by providing gas tight caps (not shown) on both ends of the coaxial unit 30 and admitting a gas such as dry nitrogen or dry air into the unit until the pressure inside the unit reaches approximately 12 lbs. per square inch. After the coaxial unit 30 is pressurized in this manner, it is allowed to stand for a period of approximately twenty-four hours. If no substantial pressure drop occurs in the coaxial unit 30 within a period of twenty-four hours, one can be relatively confident that the adhesive seal 26 is sound throughout the length of the coaxial unit and that the unit can be further processed by placing the polyethylene jacket 28 thereon. Of course, if a substantial pressure drop is detected, various leak detection techniques can be employed; for example, rereeling the coaxial unit 30 while allowing the unit to pass through a water bath (not shown) and observing for the presence of bubbles. After a leak is detected, it can be repaired by applying manually molten adhesive copolymer material to an unsealed area.

The use of a forming, sealing and seam integrity checking system, independently of a jacket extrusion operation, allows for starts and stops in cable manufacturing to make repairs without the impairment to an extrusion operation which would ordinarily result from a starting or stopping of cable progress in an operation where extrusion was being performed.

If circumstances were to make it unimportant to be able to start and stop the forming and sealing operation, the application of the jacket 28 could be done in a tandem operation (not shown) with the forming and sealing without intermediate reeling of the coaxial unit 30. A conventional device (not shown) for checking the integrity of the adhesive seal 26 could be used in a scheme wherein faulty areas were marked so that they could be repaired or cut out of the cable 20 after the jacket 28 had been applied.

It is possible by the use of such detection systems to assure the complete integrity of the adhesive seal 26 and thereby reduce the motivation for bonding the polyethylene jacket 28 to the entire periphery of the moisture barrier 22.

Bonding of the jacket 28 to the moisture barrier 22 has as one of its main purposes the prevention of water flow along the length of the communications cable 20 between the moisture barrier and the plastic jacket. Water may enter the communications cable 20 through holes (not shown) in the plastic jacket 28 which have been formed during lightning strikes or damage by animals and the like. If the adhesive seal 26 does not have assured integrity, the water which may enter through the holes and other minor openings might progressively travel along the length of the communications cable 20 and eventually enter the coaxial unit 30 through an unsealed area of the seam portion 40. The assurance of the seam portion 40 being fully sealed, which can be had by using the above-described techniques, makes the possibility of longitudinal flow of water along the communications cable 20, between the jacket 28 and the moisture barrier 22 (FIG. 1) relatively inconsequential from a moisture diffusion point of view.

Figure 7:
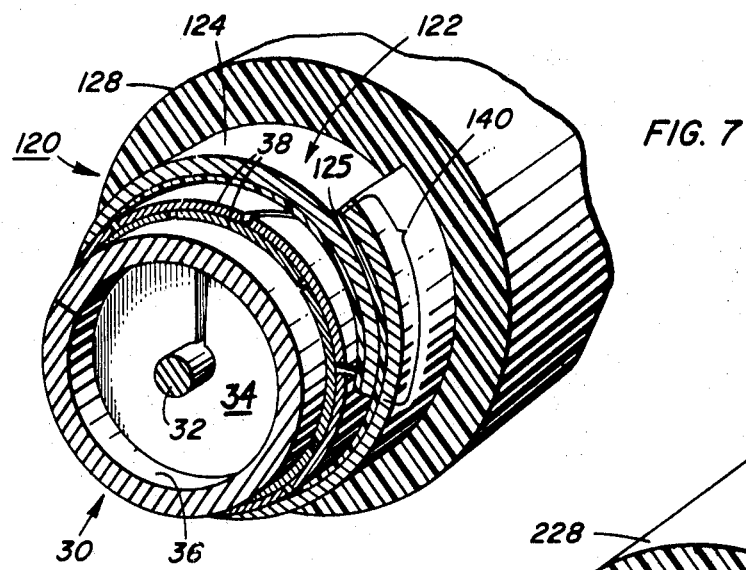
FIG. 7 is a perspective, cross-sectional view of an alternate embodiment of the cable shown in FIG. 1.

Referring now to FIG. 7, there is shown an alternate embodiment of a communications cable, designated generally by the numeral 120, with a moisture barrier, designated generally by the numeral 122, on the coaxial unit 30. In this case, a metallic strip 124 of the moisture barrier 122 is entirely coated on the one of its major surfaces which faces the unit 30 with an adhesive copolymer film 125. At a seam portion 140, the film 125 is adhesively bonded to both the inner and outer major surfaces of the metallic strip 124.

Sealing of the seam portion 140 can be accomplished by either of the heat introducing techniques herein described and illustrated generally in FIGS. 2 and 6 or any other appropriate method. The adhesive copolymer film 125 is on the inner major surface of the metallic strip 124 so that heat transfer from a polyethylene jacket 128 into the metallic strip is not impaired by the insulating characteristics of the adhesive copolymer film.

Although use of the metallic strip 124 which is fully coated on its inner major surface with the adhesive copolymer film 125 is apparently more expensive than use of the relatively narrow adhesive tape 64 (FIG. 3) introduced separately into the seam portion 40 (FIG. 1), the coated metallic strip can often find utility in circumstances where equipment is not readily available for the insertion of an independent tape of adhesive copolymer. Many existing cable manufacturing facilities can be utilized to make the communications cable 120 with the adhesively sealed moisture barrier 122, simply by substituting the metallic strip 124, which is commercially available with the adhesive copolymer film 125 for uncoated metal which is usually used in cable sheaths where prevention of moisture diffusion is not an important consideration.

It is known in the prior art to coat, with adhesive copolymer, both sides of metal tapes which are used to prevent moisture diffusion into cables. The present invention, however, by placing the adhesive copolymer film 125 on only the inner major surface of the metallic strip 124, takes advantage of heat insulating properties available in coatings of adhesive copolymers to protect the disc insulators 34—34 from heat damage while not realizing a disadvantage of preventing heat transfer into the seam portion 140, which is sometimes associated with the presence of adhesive copolymer on the outer surface of metal tapes used in cables.

Another possible alternative embodiment of the invention (not shown) resides in a method of producing a modification of the cable 120 shown in FIG. 7. This embodiment might include coating partially copolymer on the metallic strip 124, so that when the metallic strip is formed around the coaxial unit 30, the copolymer is present only in the seam portion 140.

Figure 8:
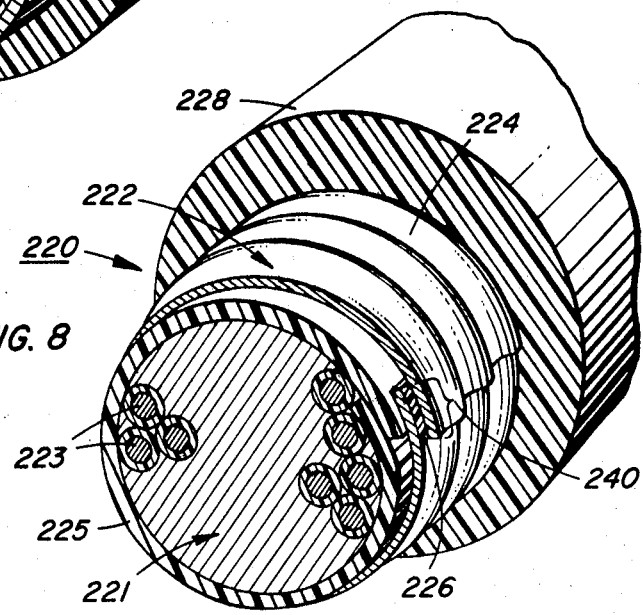
FIG. 8 is a perspective, cross-sectional view of another alternate embodiment of the cable in which successive layers of the cable have been partially removed for purposes of clarity and in which various layers of material are shown disproportionately thick for purposes of clarity.

Still another embodiment of the invention includes a method of manufacturing a communications cable, designated generally by the numeral 220 and illustrated in FIG. 8. The communications cable 220 is provided with a core, designated generally by the numeral 221 and a moisture barrier, designated generally by the numeral 222. The core 221 is formed of conductors 223 insulated preferably with polyethylene and stranded together. A transversely corrugated metallic element 224 having an adhesive seal 226 surrounds the core 221. The preferred material for the metallic element 224 is Electrical-Conductor grade aluminum 0.008 inch thick. A core wrap 225 having high dielectric strength is disposed between the core 221 and the metallic element 224 in order to provide electrical and thermal insulating protection for the conductors 223—223. The preferred material for the core wrap 225 is CRS rubber 0.015 inch thick laminated to polyethylene terephthalate 0.001 inch thick. A polyethylene jacket 28 surrounds the moisture barrier 222.

The corrugated metallic element 224 operates as a barrier against moisture diffusion, a shield against outside electrical disturbances and also as a mechanical protection device to prevent crushing or other damage to the core 221. The mechanical protection properties of the corrugated metallic element 224 are increased considerably by the making of the adhesive seal 226 because a rigid structure results from the sealing.

In order to assure that proper contact pressure is developed in the case where heat is introduced to make the adhesive seal 226 by the extrusion of the jacket 228 over the metallic element 224, it is preferred to preform the outer edges of a planar tape (not shown) before it is formed into its tubular shape as the metallic element 224. Preforming would consist of imparting a slight curvature into those portions of the tape which eventually become components of the seam portion 240 before the shaping of the entire tape into tubular form.

Application of heat and introduction of adhesive material into a seam portion 240 of the moisture barrier 222 to make the adhesive seal 226 may be accomplished in any of the ways described above with the exception that tubular forming of the corrugated metallic element 224 is preferably accomplished in a driven, belt-forming device (not shown) instead of the tube-forming device 42 shown in FIGS. 2 and 3. A belt-forming device capable of providing the necessary forming is disclosed in U.S. Pat. 3,258,950 issued July 5, 1966 to H. E. Durr. It is also possible to combine a precoating of the metallic element 224 with a film of adhesive copolymer on its inner major surface with the introduction of a strip of adhesive material into the seam portion 240 in order to achieve a higher probability for success in accomplishing a proper sealing.

The term "facing" as employed in the specification and appended claims when referring to the relationship between a surface and an object will be understood to means that the surface is oriented in the direction of the object and may be, but is not necessarily, adjacent to or in contact with the object.

The term "major surface" as employed in the specification and appended claims when referring to surfaces of a strip of material will be understood to include the large faces of the strip and not the edges of the strip even though the faces might have curved, corrugated or otherwise non-planar configurations and even though the edges might blend smoothly into the faces without any sharp geometrical definition.

The term "polymeric material" as employed in the specification and appended claims will be understood to include both thermoplastic compounds such as polyethylene and polyvinyl chloride or the like, thermosetting compounds such as neoprene compounds or other elastomers or blends of thermosetting and thermoplastic compounds.

It is to be understood that the above-described arrangements are simply illustrative of the principles of the invention. Other arrangements may be devised by those skilled in the art which will embody the principle of the invention and fall within the spirit and scope thereof.

What is claimed is:

1. A process for manufacturing a cable which comprises the steps of:
   advancing successive sections of a cable core along a predetermined path,
   forming at least one metallic strip around successive sections of the advancing cable core with at least one overlapped seam, and with the resultant formed strip having inwardly and outwardly facing major surfaces, the inwardly facing major surface facing the core,
   introducing an essentially non-metallic sealing material between the contiguous, adjacent, mating portions of the major surfaces of the metallic strip which face each other at the overlapped seam, simultaneously with forming the overlapped seam, with the presence of any of the sealing material on the major surfaces of the metallic strip, other than at the overlapped seam, being restricted in location to the inwardly facing major surface facing the core, the essentially non-metallic sealing material being characterized by being capable of maintaining a definite form at ambient temperature, and being capable of developing an adhesive bond with the metallic strip at a predetermined temperature above ambient temperature, applying heat to successive portions of the overlapped seam to elevate the temperature of the adhesive material to at least the predetermined temperature, and maintaining a proper positional relationship between the contiguous, adjacent, mating portions of the major surfaces of the metallic strip which face each other at the overlapped seam to assure that the sealing material contacts at least some part of the mating portions of the major surfaces while the material is at the elevated temperature.

2. The process for manufacturing a cable of claim 1, which comprises the step of: checking the integrity of the adhesive bonding at the overlapped seam.

3. A process for manufacturing a cable which comprises the steps of:

advancing successive sections of a cable core along a predetermined path, applying one metallic strip, at least partially coated with an essentially non-metallic sealing material, around successive sections of the advancing cable core with at least one overlapped seam, with the metallic strip having inwardly and outwardly facing major surfaces, the inwardly facing major surface facing the core, with the sealing material positioned at least between the contiguous, adjacent, mating portions of the major surfaces of the metallic strip which face each other and form the overlapped seam and with the presence of sealing material on the major surfaces of the metallic layer, other than at the overlapped seam, being restricted to the inwardly facing major surface facing the core, the sealing material being characterized by being capable of maintaining a definite form at ambient temperature, and being capable of developing an adhesive bond with the metallic strip at a predetermined temperature above ambient temperature, applying heat to successive portions of the overlapped seam to elevate the temperature of the sealing material to at least the predetermined temperature, and maintaining a proper positional relationship between the contiguous, adjacent, mating portions of the major surfaces of the metallic strip which face each other at the overlapped seam to assure that the sealing material contacts at least some parts of the mating portions of the major surfaces while the material is at the elevated temperature.

4. The process for manufacturing a cable of claim 3, wherein heat is applied to successive portions of the overlapped seam by:

extruding a jacket of polymeric material over the core outside of the metallic strip, and permitting the temperature of the portion of jacket adjacent to the metallic strip to remain a least at a predetermined temperature for at least a predetermined period of time, the combination of the predetermined temperature and the predetermined time being such that a sufficient temperature elevation occurs in the sealling material at the overlapped seam so that the sealing material develops an adhesive bond with the contiguous surfaces of the metallic strip, and wherein the predetermined temperature at which the sealing material is capable of developing an adhesive bond with the metallic strip is less than the temperature at which the jacket is extruded over the core.

5. A process for manufacturing a cable which comprises the steps of:

advancing successive sections of a cable core along a predetermined path, forming at least one metallic strip around successive sections of the advancing cable core with at least one overlapped seam, introducing successive sections of at least one tape of essentially non-metallic sealing material between the contiguous, adjacent, mating portions of the areas of the metallic strip which face each other at the overlapped seam, the tape being capable of maintaining a definite form at ambient temperature, and being capable of developing an adhesive bond with the metallic strip at a predetermined temperature above ambient temperature, applying heat to successive portions of the tape to elevate the temperature of the tape to at least the predetermined temperature, and maintaining a proper positional relationship between the contiguous, adjacent, mating portions of the areas of the metallic strip which face each other at the overlapped seam to assure that the tape contacts at least some parts of the mating portions of the metallic strip while the tape is at the elevated temperature.

6. The process for manufacturing a cable of claim 5, wherein heat is applied to successive portions of the tape by:

extruding a jacket of polymeric material over the core on the outside of the metallic strip, and permitting the temperature of the portion of jacket adjacent to the metallic strip to remain at least at a predetermined temperature for at least a predetermined period of time, the combination of the predetermined temperature and the predetermined time being such that a sufficient temperature elevation occurs in the tape so that the tape develops an adhesive bond with the contiguous surfaces of the metallic strip, and wherein the predetermined temperature at which the tape is capable of developing an adhesive bond with the metallic strip is less than the temperature at which the jacket is extruded over the core.

References Cited

UNITED STATES PATENTS

| | | | |
|---|---|---|---|
| 2,152,706 | 4/1939 | Mougey | 174—36X |
| 2,838,437 | 6/1958 | Froemming et al. | 161—216X |
| 2,852,423 | 9/1958 | Bassett, Jr. | 174—109X |
| 3,011,933 | 12/1961 | Barnes et al. | 174—102X |
| 3,261,906 | 7/1966 | Gee-Wah et al. | 174—28 |
| 3,325,589 | 6/1967 | Mildner | 174—107 |
| 3,272,912 | 9/1966 | Jachimowicz | 174—107 |
| 3,332,138 | 7/1967 | Garner | 154—54X |
| 3,344,228 | 9/1967 | Woodland et al. | 174—107X |

FOREIGN PATENTS

| | | | |
|---|---|---|---|
| 1,030,446 | 5/1966 | Great Britain | 161—216 |

VERLIN R. PENDEGRASS, Primary Examiner

U.S. Cl. X.R.

174—107